United States Patent
Durfee et al.

(10) Patent No.: US 9,156,094 B2
(45) Date of Patent: Oct. 13, 2015

(54) STEP DRILL FOR WOOD

(71) Applicants: LaVerne R. Durfee, Harmony, NC (US); Ryan F. Hall, Charlotte, NC (US)

(72) Inventors: LaVerne R. Durfee, Harmony, NC (US); Ryan F. Hall, Charlotte, NC (US)

(73) Assignee: Irwin Industrial Tool Company, Huntersville, NC (US)

( * ) Notice: Subject to any disclaimer, the term of this patent is extended or adjusted under 35 U.S.C. 154(b) by 218 days.

(21) Appl. No.: 13/744,501

(22) Filed: Jan. 18, 2013

(65) Prior Publication Data

US 2013/0189044 A1    Jul. 25, 2013

Related U.S. Application Data (60) Provisional application No. 61/589,529, filed on Jan. 23, 2012.

(51) Int. Cl.
| | | |
|---|---|---|
| *B27G 15/00* | (2006.01) | |
| *B23B 51/00* | (2006.01) | |
| *B23B 51/02* | (2006.01) | |

(52) U.S. Cl.
CPC ............ *B23B 51/009* (2013.01); *B23B 51/0054* (2013.01); *B23B 51/02* (2013.01); *B27G 15/00* (2013.01); *B23B 2251/242* (2013.01); *Y10T 408/902* (2015.01); *Y10T 408/906* (2015.01); *Y10T 408/9065* (2015.01)

(58) Field of Classification Search
USPC .......... 408/211–213, 214, 224–225, 227, 230
See application file for complete search history.

(56) References Cited

U.S. PATENT DOCUMENTS

| | | | | |
|---|---|---|---|---|
| 89,097 | A | * | 4/1869 | Wardwell ...................... 408/224 |
| 469,057 | A | | 2/1892 | Chesnut |
| 550,190 | A | | 11/1895 | Myers |
| 1,747,117 | A | * | 2/1930 | Klein ........................... 76/108.6 |
| 2,276,532 | A | | 3/1942 | Welty |
| 2,786,373 | A | | 3/1957 | Patton |
| 2,984,130 | A | | 5/1961 | Lentz |
| 3,064,699 | A | * | 11/1962 | Gleason ........................ 408/212 |
| 3,076,356 | A | | 2/1963 | Simich |
| 3,165,131 | A | * | 1/1965 | Mackey ....................... 408/201 |

(Continued)

FOREIGN PATENT DOCUMENTS

| | | |
|---|---|---|
| CN | 101856737 A | 10/2010 |
| CN | 201988772 U | 9/2011 |

(Continued)

OTHER PUBLICATIONS

Irwin Industrial Tool Company, Chinese Application No. 201310025630.X, Office Action, Feb. 27, 2015.

*Primary Examiner* — Daniel Howell
*Assistant Examiner* — Yasir Diab
(74) *Attorney, Agent, or Firm* — Sutherland Asbill & Brennan LLP (57) ABSTRACT

A wood drill bit has a plurality of step sections where each step section has at least one flute that terminates in a cutting edge. The effective diameter of each of the plurality of step sections is different than the diameter of the other of the plurality of step sections such that a single bit may be used to bore holes in wood of different diameters.

22 Claims, 9 Drawing Sheets

(56) References Cited

U.S. PATENT DOCUMENTS

| | | | |
|---|---|---|---|
| 3,758,222 | A | 9/1973 | Oakes |
| 4,127,355 | A | 11/1978 | Oakes |
| 4,582,458 | A | 4/1986 | Korb et al. |
| 5,466,100 | A | 11/1995 | Ahluwalia |
| 5,816,812 | A | 10/1998 | Kownacki et al. |
| 5,934,845 | A | 8/1999 | Frey |
| 6,890,133 | B2 | 5/2005 | Singh et al. |
| 9,004,826 | B2 | 4/2015 | Wedner |
| 2008/0138165 | A1 | 6/2008 | Durfee |
| 2008/0166194 | A1 | 7/2008 | Durfee |
| 2010/0003094 | A1 | 1/2010 | Durfee |
| 2010/0307640 | A1 | 12/2010 | Durfee et al. |
| 2011/0038679 | A1 | 2/2011 | Kozak |

FOREIGN PATENT DOCUMENTS

| | | | |
|---|---|---|---|
| DE | 19526686 | A1 | 3/1996 |
| DE | 29703475 | U1 | 6/1997 |
| DE | 20015550 | U1 | 10/2000 |
| EP | 2239075 | A2 | 10/2010 |
| GB | 995043 | | 6/1965 |
| GB | 2394197 | A | 4/2004 |
| GB | 2405820 | A * | 3/2005 |
| JP | 11239907 | A | 9/1999 |
| JP | 2006082420 | A * | 3/2006 |
| JP | 2007007831 | A | 1/2007 |
| KR | 100628885 | B1 | 9/2006 |
| WO | WO 0110587 | A1 * | 2/2001 |

* cited by examiner

STEP DRILL FOR WOOD

This application claims benefit of priority under 35 U.S.C. §119(e) to the filing date of U.S. Provisional Application No. 61/589,529, as filed on Jan. 23, 2012, which is incorporated herein by reference in its entirety.

BACKGROUND

Drill bits are known for boring holes in wood. Such bits may typically include a fluted cutting portion that is connected to a shank for connecting the drill bit to a rotary tool. The fluted cutting portion has a diameter that corresponds to the desired diameter of the hole to be drilled. In some embodiments the cutting portion may be formed with a plurality of curved flutes and lands that define a plurality of cutting edges. The cutting edges are formed at a single diameter along the length of the cutting portion such that the drill bit cuts a predetermined diameter hole. As a result, different diameter drill bits are used to drill different diameter holes with each bit capable of drilling a single diameter hole.

SUMMARY OF THE INVENTION

In one embodiment a wood drill bit comprises a plurality of step sections where each of the plurality of step sections comprises at least one flute that defines a cutting edge having an effective diameter. The effective diameter of one of the plurality of step sections is different than the effective diameter of another one of the plurality of step sections. At least one of the plurality of step sections may have a length of at least 1.5 inches. The bit may comprise three step sections. At least two of the three step sections may have a length of at least 1.5 inches. Each of the plurality of step sections may comprise a plurality of flutes and a plurality of lands defining a plurality of cutting edges. Each of the plurality of step sections may comprise three flutes and three lands. At least one flute of each of the plurality of step sections may be disposed on the same curve such that the at least one flute of each of the plurality of step sections defines a continuous curve along the length of the bit. The plurality of step sections may be arranged such that the diameter of a trailing step section is greater than the diameter of an adjacent leading step section. At least one flute of each of the plurality of step sections may terminate in a radial cutting edge such that the radial cutting edge of each step section cuts progressively larger diameter bores. The radial cutting edge may terminate in a spur. At least one step section of the plurality of step sections may have a length of approximately 2 inches. At least one step section of the plurality of step sections may be preceded by a threaded portion. At least one step section of the plurality of step sections may be formed with a pointed lead screw. Each of the plurality of step sections may be preceded by a threaded portion. Each of the threaded portions may have a pitch where the pitch of each of the threaded portions is the same. At least one step section of the plurality of step sections may be formed with an unthreaded lead tip. Each of the plurality of step sections may be formed of a first material and a second material. The first material may be harder than the second material. A first step section, a second step section and a third step section may be provided where the first step section and the second step section have a length of at least 1.5 inches and the third step section has a length of less than 1.5 inches.

In one embodiment a method of making a drill bit comprises forming a plurality of flutes into a blank stock of material to create a drill body; and forming a plurality of step sections by reducing the diameter of the drill body to define a plurality of effective drill diameters.

DETAILED DESCRIPTION OF EMBODIMENTS OF THE INVENTION

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

The invention relates to a step drill bit that is provided with variable diameter step sections that is usable to drill through wood. The step drill bit as described herein is able to drill multiple different diameter holes. In some embodiments each step has a relatively long length such that each step may be capable of drilling through a desired thickness of material. For example, in some embodiments each step of the bit may have a length that allows each step of the bit to drill through a standard 2×4 board.

Referring to FIGS. 1-4, in one embodiment, the bit 1 includes a shaft or shank 2 that is adapted to be connected to the chuck of a rotary tool such as a power drill or the like. The shaft or shank 2 may comprise a hexagonal shank having an annular recess 3 formed therein to create a quick connect coupler. The hexagonal shank 2 is inserted into the chuck of the turning tool such that a ball, post or other tang may be inserted into the recess 3 to retain the shank 2 in the rotary tool. Other connectors may be provided on the shank for connecting the bit to a rotary tool and the drill bit as shown herein may be used with other than a quick connect chuck.

The shaft or shank 2 is connected to a cutting portion or head 5 having the step drill configuration of the invention. The cutting portion 5 and shank 2 may be connected by a transitional area 7. In some embodiments the shank 2 and cutting portion 5 may be formed as one-piece. In other embodiments, the shank and cutting portion, or portions of the cutting portion and shank, may be formed of separate elements, and may be made of different materials, connected together to form the bit. The materials may be selected to have different properties where, for example, the cutting portion may be formed of a harder material than the shank. Moreover, selected portions of the cutting portion may be formed of different materials than the remainder of the cutting portion. For example, the cutting edges or cutting tips may be formed of a harder material than the remainder of the cutting portion. The cutting edges, or portions of the cutting edges, may also be made as removable inserts.

In the illustrated embodiment, the cutting portion 5 is formed with three step sections 6, 8 and 10 although a greater or fewer number of step sections may be used. Each step section 6, 8 and 10 comprises a plurality of flutes 12 defining a plurality of lands 14 where the lands 14 and flutes 12 create curved, generally helical cutting edges 14a that define an effective diameter cutting section. As used herein the term "effective diameter" means that the cutting edges of each of step sections 6, 8 and 10 cut a hole of a predetermined diameter. The effective diameters differ between the step sections 6, 8 and 10. The lands 14 may not have a constant diameter over the circumference of the bit because the lands 14 may be provided with a radial relief between the cutting edges 14a and the trailing edges 14b of each land 14; however, the effective diameter of each step section as defined by the diameter across the cutting edges defines the size of the bore drilled by that step section. Further, each of the step sections may be provided with axially relief such as described in US Patent Application Publication No. 2008/0138165, entitled "Drill Bit" which is incorporated by reference herein in its entirety.

As used herein the terms "leading" and "trailing" refer to the relative orientation of the components during operation of the drill bit. Thus, a leading edge is an edge that is toward the front of the rotating bit and a trailing edge is an edge toward the rear of the rotating bit. Typically, a leading edge forms a cutting edge such that the leading edge has a sharp cutting geometry for cutting or chipping the material being drilled. Likewise, a leading step section is a step section toward the free end of the drill bit and a trailing step section is a step section toward the shank 2 of the bit.

In the illustrated embodiment three flutes 12 and three lands 14 are provided on each of step sections 6, 8 and 10 that define three corresponding generally helical cutting edges 14a, although a greater or fewer number of flutes, lands and cutting edges may be used. Further, each of the step sections 6, 8 and 10 may not have the same number of flutes and lands. The number, shape and size of the lands and flutes may vary from those shown and described herein. In one embodiment the step sections 6, 8 and 10 comprise the same number of lands and flutes where the lands and flutes are formed continuously with one another such that the lands and flutes of each step section are coextensive with the lands and flutes of the adjacent step sections. In such an arrangement, the flutes of the step sections 6, 8 and 10 are disposed on the same helical curve and the lands of the step sections 6, 8 and 10 are disposed on the same helical curve such that the coextensive flutes and lands define a continuous curve as they extend along the length of the bit.

The lands and flutes of each step section also create radial cutting edges 16. Each radial cutting edge 16 extends from the outside edge of the land toward the rotational axis A-A of the bit generally along a radius of the bit. The radial cutting edges 16 of each step section 6, 8 and 10 cut progressively larger diameter bores than the adjacent leading radial cutting edge. The radial cutting edges 16 may terminate in spurs 18 that cut a smooth edge on the hole. The steps 6, 8 and 10 are arranged such that the effective diameter of each step section is smaller than the diameter of the adjacent trailing step and larger than the adjacent leading step. In other words the effective diameters of the step sections increase from the leading end of the bit toward the shank 2. The effective diameters of each step section may correspond to standard bore dimensions such as, but not limited to, ¼ inch, ½ inch and ¾ inch. The dimensions may vary greatly and may be different than those specifically disclosed herein. Further, the dimensions may be in different units.

While the illustrated embodiment shows an embodiment of a drill bit having three step sections 6, 8 and 10, the drill bit may be provided with two step sections, four step sections or more step sections. The number of step sections may be determined by the overall length of the cutting portion 5 of the bit and the length of each of the step sections. The length L of the fluted portion of each step section is selected such that for each step section the drill is capable of drilling a bore of a desired length. In one embodiment the fluted portion of each step section has a length L that allows the step section to drill through a standard 2×4, 2×6, 2×8 board or the like. In such an embodiment the fluted portion of each step section has a length L of at least 1.5 inches and may be approximately 2 inches in length. However, the length of the step sections may be longer or shorter depending upon the length of the bore to be drilled. It should be noted that the last step section (step section 10 in the illustrate embodiment) does not have to be the full desired bore length L because the last step section may utilize the length of the shank 2 to extend the cutting edges the desired length of the bore. Thus, a bit that comprises three step sections, each of which is intended to cut through a standard 2×4 board, may have a cutting portion 5 of a total length of approximately 5 to 6 inches where the first two step sections have a length of approximately 2 inches and the last step section may have a shorter length as described above. Similarly, a bit with four step sections may have a cutting portion 5 with a length of 7 to 8 inches. Where the step sections have individual lengths of less than 1.5-2 inches the overall length of the cutting portion 5 may be correspondingly shorter and where the step sections have individual lengths of greater than 1.5-2 inches the overall length of the cutting portion 5 may be correspondingly longer. Moreover, each of the step sections may have a different length. Such an arrangement may be beneficial where the bore diameters cut by each of the step sections are used in different applications. For example, the first step section 6 may have a length of approximately 2 inches for cutting through a standard 2×4, 2×6, 2×8 board while the second section 8 may have a length of approximately one inch for cutting through a standard 1×2, 1×4, 1×6 board or the like. The relative lengths may also be reversed where the trailing step section has a longer length dimension than the leading step section.

Figure 1:
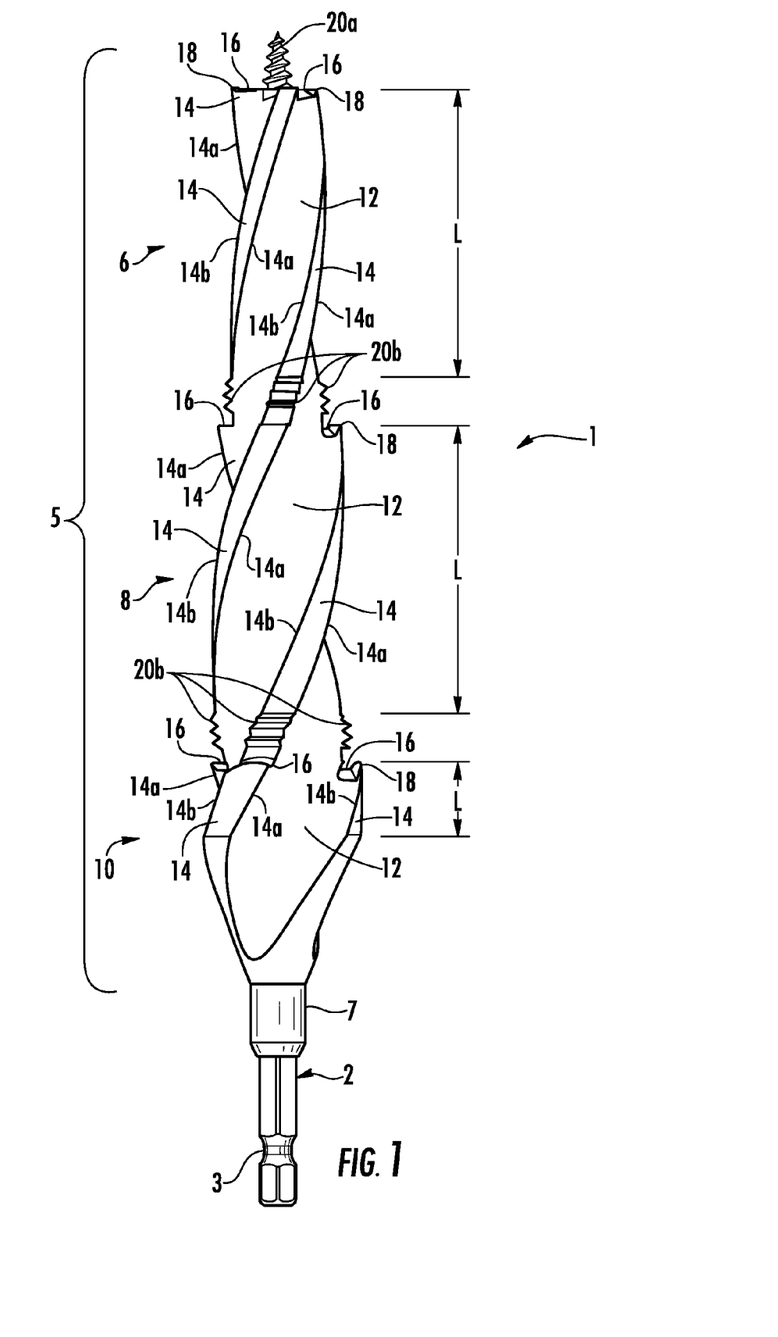
FIG. 1 is a plan view of one embodiment of the bit of the invention.
Figure 2:
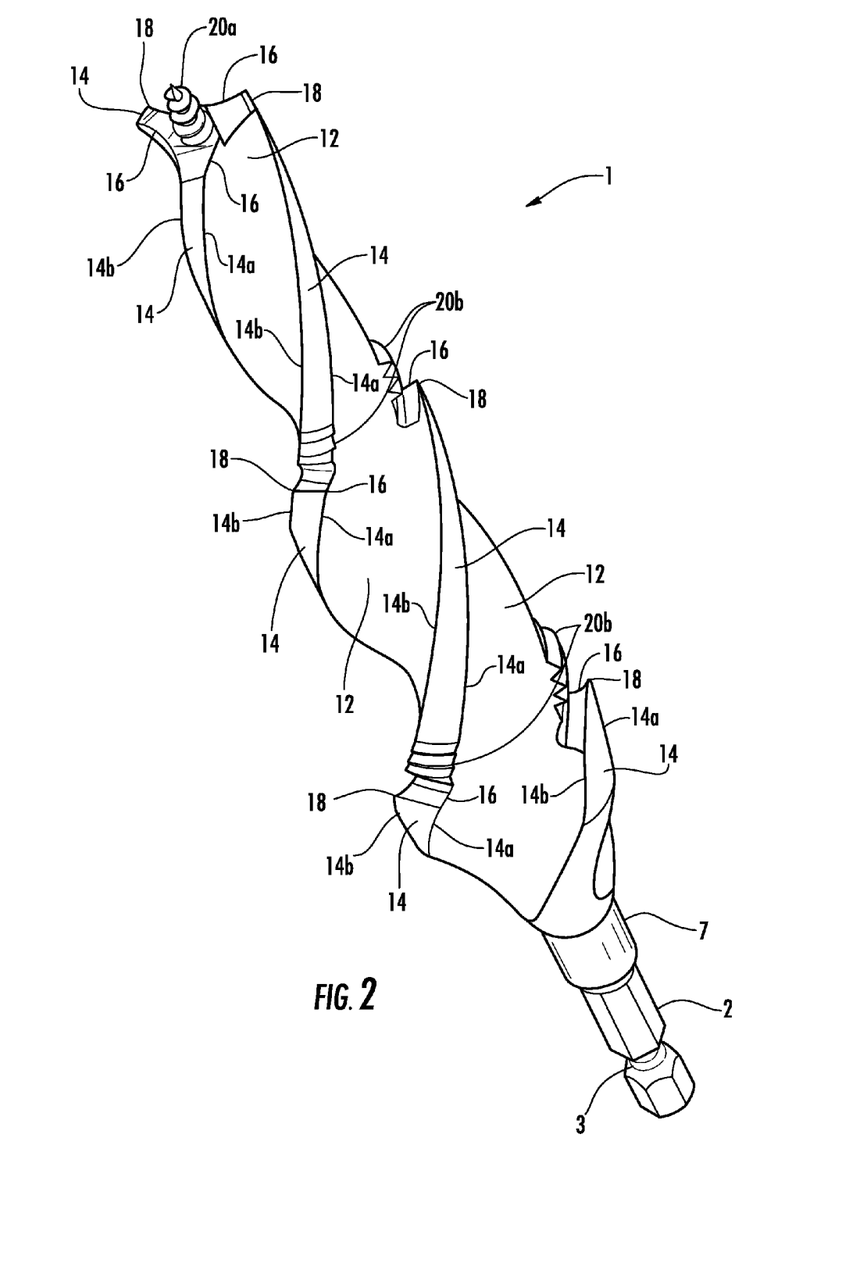
FIG. 2 is a perspective view of the bit of FIG. 1.
Figure 3:
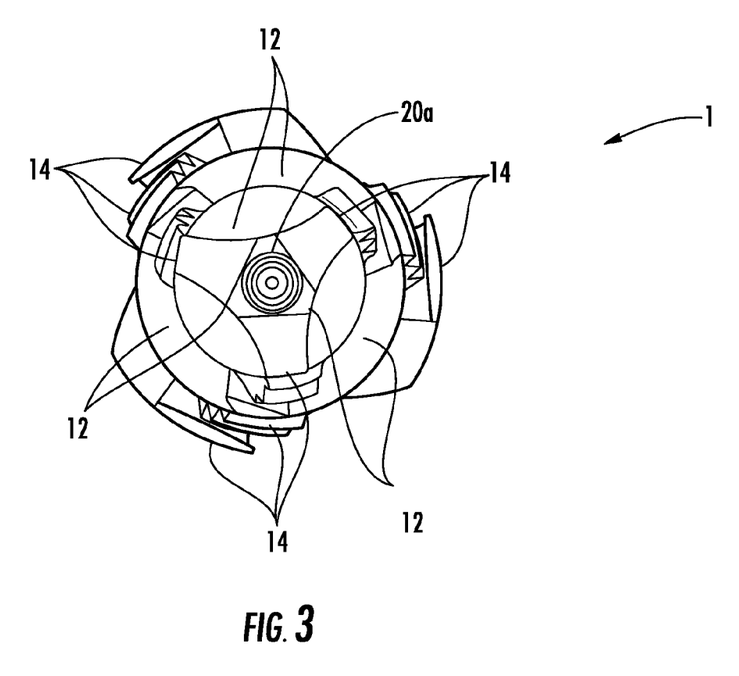
FIG. 3 is an end view of one end of the bit of FIG. 1.
Figure 4:
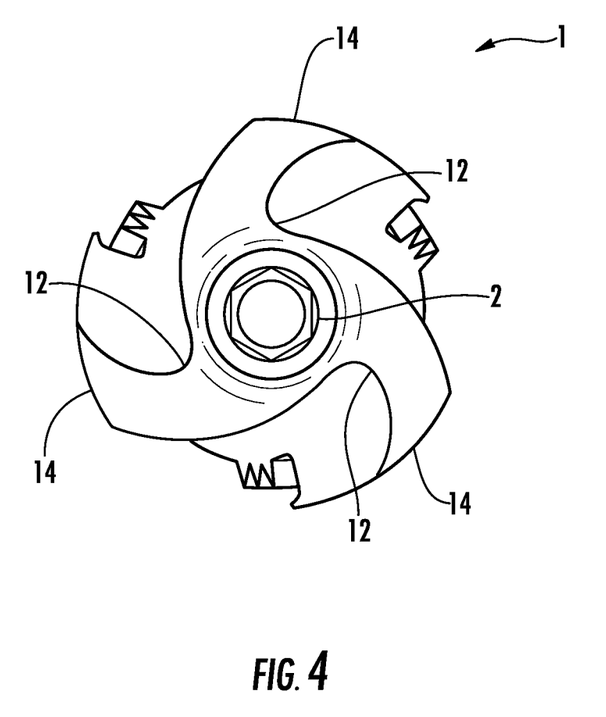
FIG. 4 is an end view of the opposite end of the bit of FIG. 1.

In one embodiment, each step section 6, 8 and 10 is preceded by a threaded portion or lead screw that allows the bit to be self-feeding for each step section as shown in FIG. 1. The end of the bit may be formed with a pointed lead screw 20a to self-feed the bit into the wood. Moreover, a screw or threaded portion 20b may be provided leading into each step section 8 and 10 to self-feed each step section of the bit through the material being cut. The screws 20b are disposed between the cutting portion of each leading step section and the radial cutting edges 16 of the trailing step section such that as each step section engages the material being cut the lead screw self-feeds the bit into the material being cut. In some embodiments, the pitch of each of the screws 20a and 20b is the same such that each of the screws feed the bit into the material at the same linear rate, i.e. the linear distance of travel of the bit through the material is the same for each revolution of the bit for each of the screws. While in one embodiment the pitch is the same for each of the threaded portions, the pitches of the threaded portions may vary. However, if the pitches vary it may be necessary during use of the bit to ensure that the leading screws clear the material before the trailing screws engage the material to prevent the screws from attempting to feed the bit through the material at different rates.

Figure 5:
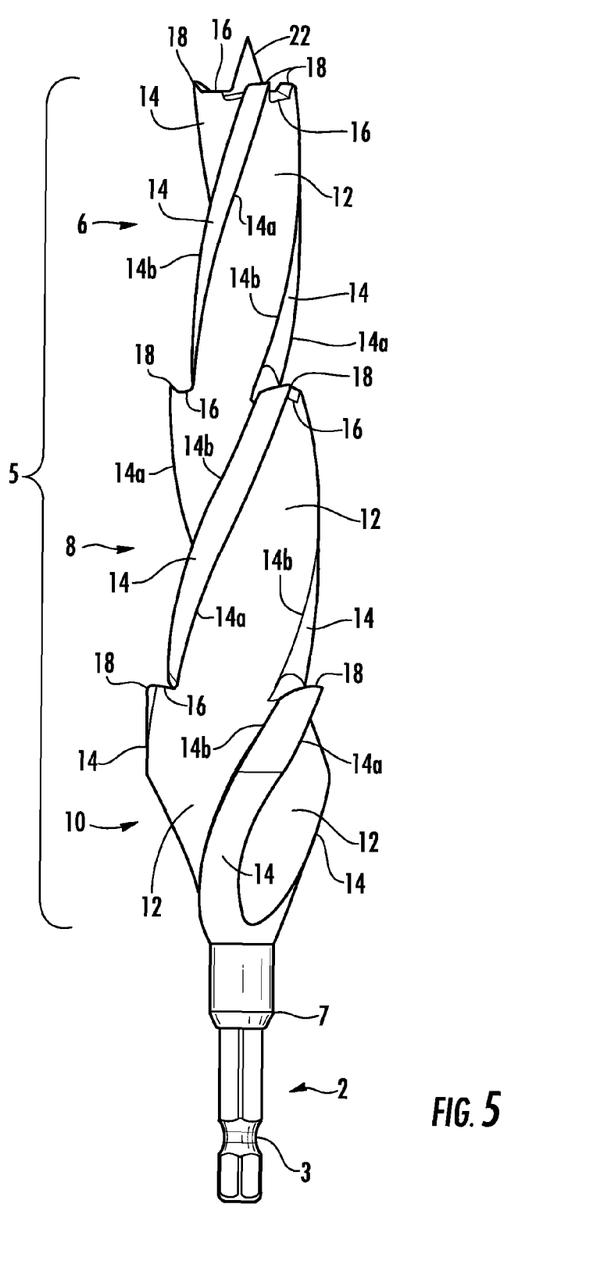
FIG. 5 is a plan view of another embodiment of the bit of the invention.
Figure 6:
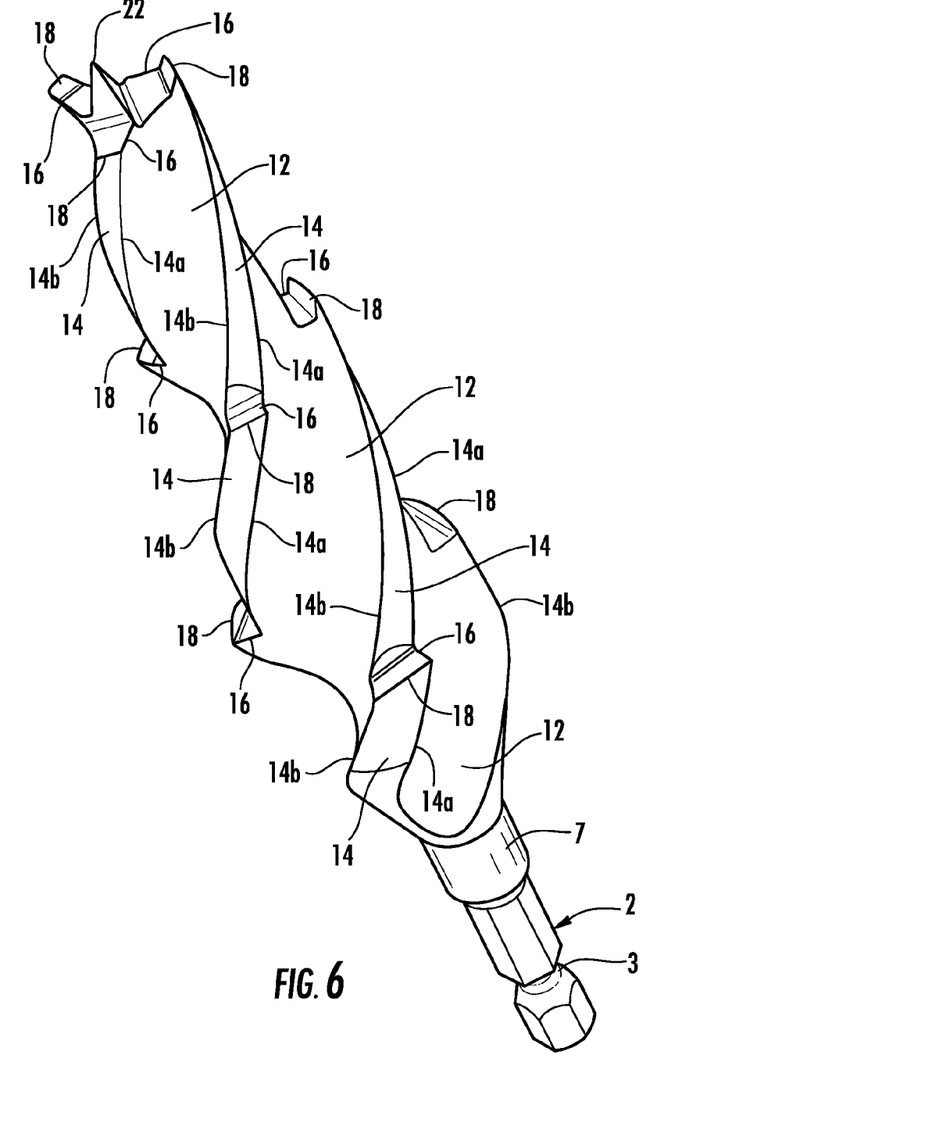
FIG. 6 is a perspective view of the bit of FIG. 5.

In another embodiment the drill bit includes an unthreaded lead point 22 as shown in FIGS. 5 and 6. The threaded sections 20b between the step sections in the embodiment of FIGS. 1-4 are also eliminated from the embodiment of FIGS. 5 and 6 such that the bit of FIGS. 5 and 6 is not self-feeding. Without the lead screws, the feed rate of the bit may be controlled by the operator.

While the bit has been described in one embodiment with screws leading into each of the step sections and in another embodiment without screws leading into any of the step sections, the bit may combine these features. For example, the bit may be provided with a single lead screw at the end of the bit but with no additional intermediate screws. Moreover, some of the step sections may be provided with a lead screw but other of the step sections may be provided without the lead screw. Moreover, the tip of the bit may be provided with a chisel tip rather than the lead screw or lead point.

Figure 7:
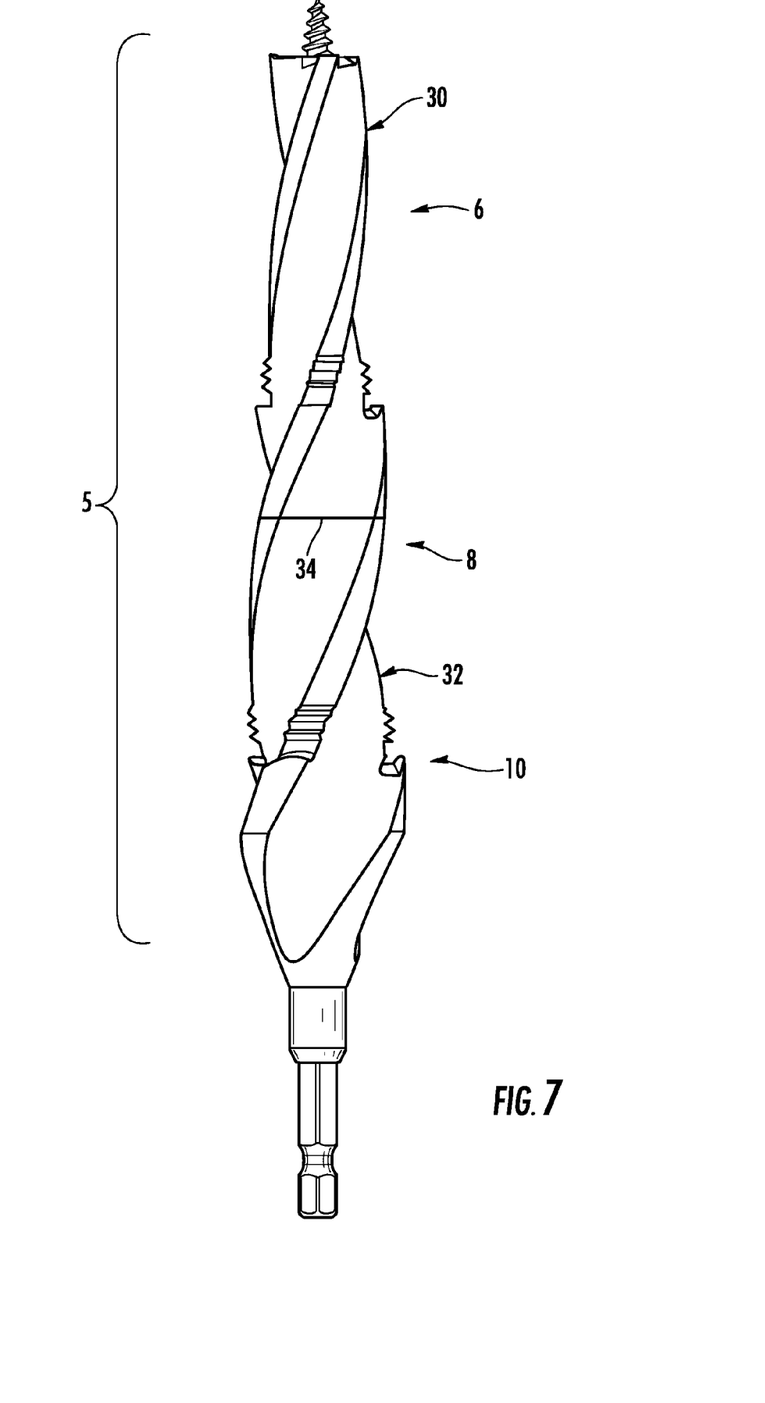
FIG. 7 is a plan view of another embodiment of the bit of the invention.

In some embodiments, the bits described herein may be made using a bimetal construction as disclosed U.S. Patent Application Publication Pub. No. US 2008/0166194, the disclosure of which is incorporated herein by reference in its entirety and U.S. Patent Application Publication Pub. No. US 2010/0003094, the disclosure of which is incorporated herein by reference in its entirety. Referring to FIG. 7, the bi-metal drill bit may comprise a first portion 30 of a first material and a second portion 32 of a second material. In one embodiment the portions are formed from cylindrical blanks, however, blanks having other shapes may be used. A first blank is welded to a second blank at weld line 34 to create a bi-metal blank. Typically, the first material comprises a harder material than the second material such that the leading portion of the bit is formed with the harder material. Any suitable welding technique may be used including electric, brazing, spin, induction or resistance to join the blanks to one another. After the blanks are welded together, the flutes, lands, step sections and screws may be formed into the combined blanks. The flutes may be formed in both materials in a single operation such as a milling operation. The flutes and lands may also be formed in the blanks before the blanks are joined together.

Figure 8:
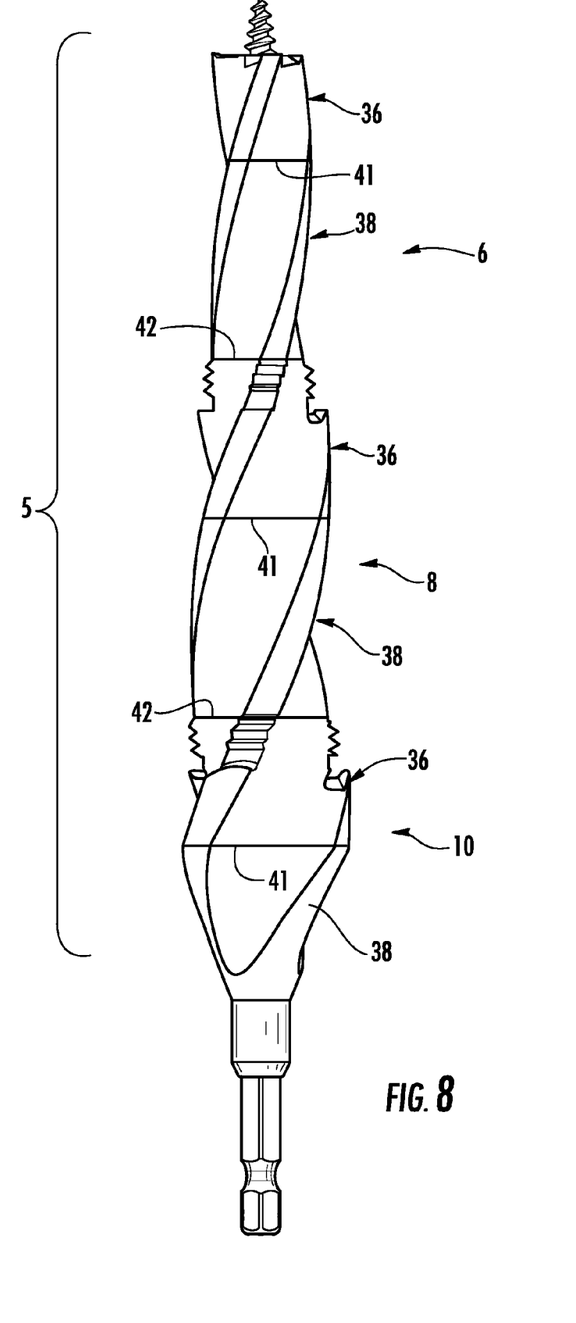
FIG. 8 is a plan view of yet another embodiment of the bit of the invention.

The weld line 34 may be located in an area of the cutting portion 5 between the end of the bit and the shank 2 such that the cutting portion 5 has a leading portion 30 made of the first material and a trailing portion 32 made of the second material. The transition between the material of the first portion and the material of the second portion is smooth and uniform such that the joint 34 between the two materials does not create an obstruction or irregularity on the surface of the bit. After the milling operation the entire bit may be hardened such as by heat treatment. After the hardening step the bit may be ground to a true diameter and sharp cutting edges may be ground into the cutting head. Because the stepped bit of the invention has multiple cutting edges formed at the leading edge of each step section 6, 8 and 10, the bit may be made of more than two blanks as shown in FIG. 8. In one embodiment a leading portion 36 of each step section 6, 8 and 10 is formed of a first material and a trailing portion 38 of each step section 6, 8 and 10 is formed of a second material. Each step section may be formed as described above to create a bit where the leading portion 36 of each step section is formed of the harder material and is welded to the trailing portion 38 of each step that is formed of a second material at weld line 41. The trailing portion 38 of each step section is welded to the leading portion 36 of the adjacent step section at weld 42.

Figure 9:
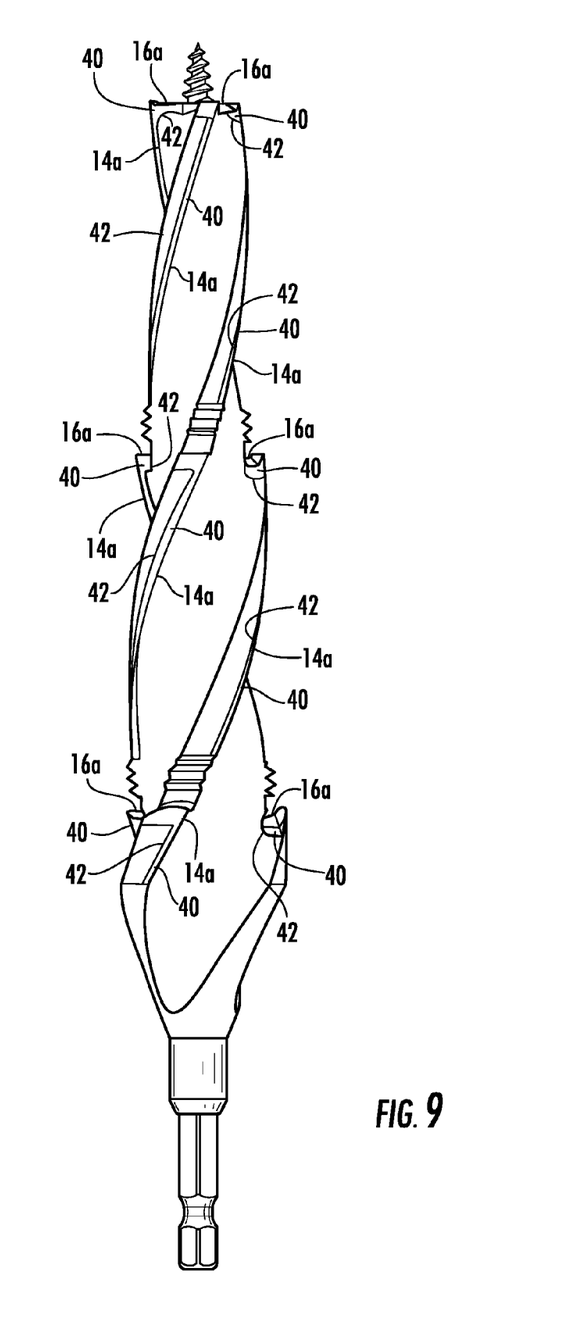
FIG. 9 is a plan view of still another embodiment of the bit of the invention.

The bit may also be made using WeldTec™ technology as disclosed in U.S. Patent Application Publication Pub. No. US 2010/0307640, the disclosure of which is incorporated herein by reference in its entirety. Referring to FIG. 9, the cutting edges 14a and/or 16a may be formed as filler material 40 made of a hard material that is harder than the material of the remainder of the bit. Except for the hard insert 40 the bit may be formed of a first material such as carbon steel. A pocket 42 is formed in each step section adjacent the location of the cutting edges 14a and/or 16a for receiving the high strength filler material 40. The filler material 40 is formed by using an alloyed bead of material such as Chrome Vanadium Alloy that is welded to the step sections in the pockets 42 using a TIG, MIG, ARC, STICK or Gas welding process. Materials other than Chrome Vanadium Alloy may also be used. In TIG (Tungsten Inert Gas) welding a tungsten electrode heats the cutting head in the area that forms pockets 42 in a protective cloud of inert gas such as argon. This process creates a relatively thin layer of weld with low core modification of mechanical and metallurgical properties. MIG or wire feed, and ARC, STICK or gas welding may also be used. The welded bead of material that forms filler material 40 is then sharpened in a grinding process to create the hard cutting edges 14a and/or 16a. The filler material 40 may be approximately 1 to 4 mm in thickness.

The cutting edges 14a and/or 16a may be formed of filler material 40 that is harder and stronger than the material making up the remainder of the drill bit. While weld lines are shown in the Figures between the pockets 42 and the filler material 40 to illustrate the weld between the step sections and the filler material 40, the transition between these portions is smooth, uniform and uninterrupted such that the cutting head transitions smoothly into the insert.

Other surface treatments and/or manufacturing processes may also be applied to the drill bit in its various embodiments to increase hardness, minimize friction or otherwise develop beneficial performance characteristics.

The bit off the invention may be made by milling the flutes into blank stock of carbon steel or other hard material to create a bit body having the lands and flutes. The step sections then may be produced by reducing the diameter of the drill body to match the different effective diameters for the step sections. Cutting edge geometry may be formed such as by grinding. The flutes, lands and cutting edge geometry may also be added after the step sections are produced.

Although specific embodiments have been illustrated and described herein, those of ordinary skill in the art appreciate that any arrangement, which is calculated to achieve the same purpose, may be substituted for the specific embodiments shown and that the invention has other applications in other environments. This application is intended to cover any adaptations or variations of the present invention. The following claims are in no way intended to limit the scope of the invention to the specific embodiments described herein.

The invention claimed is:

1. A wood drill bit comprising:
 a plurality of step sections, each of the plurality of step sections comprise at least one flute that defines a cutting edge having an effective diameter where the effective diameter of one of the plurality of step sections is different than the effective diameter of another one of the plurality of step sections wherein each of the plurality of step sections is preceded by a threaded portion.

2. The wood drill bit of claim 1 comprising:
a cutting tip and a shank, a first one of the plurality of step sections being disposed adjacent the cutting tip, a second one of the plurality of step sections being disposed adjacent the shank, and at least one additional one of the plurality of step sections being disposed between the first one of the plurality of step sections and the second one of the plurality of step sections;
the first one of the plurality of step sections and the at least one additional one of the plurality of step sections having a first length and the second one of the plurality of step sections having a second length that is less than the first length where the first one of the plurality of step sections, the at least one additional one of the plurality of step sections and the second one of the plurality of step sections are capable of cutting a hole having a length at least as long as the first length.

3. The wood drill bit of claim 2 where the first length is at least approximately 1.5 inches.

4. The wood drill bit of claim 2 comprising three step sections wherein at least two of the three step sections have a length of at least 1.5 inches.

5. The wood drill bit of claim 2 wherein the first length is at least approximately 2 inches.

6. The wood drill bit of claim 2 wherein the first length is least 1.5 inches and the second length is less than 1.5 inches.

7. The wood drill bit of claim 1 wherein the at least one flute of each of the plurality of step sections is disposed on the same curve such that the at least one flute of each of the plurality of step sections define a continuous curve along a length of the bit.

8. The wood drill bit of claim 1 wherein the at least one flute of each of the plurality of step sections terminates in a radial cutting edge.

9. The wood drill bit of claim 1 wherein at least one step section of the plurality of step sections is formed with a pointed lead screw.

10. The wood drill bit of claim 1 wherein each of the threaded portions has a pitch, the pitch of each of the threaded portions being the same.

11. The wood drill bit of claim 1 wherein at least one step section of the plurality of step sections is formed with an unthreaded lead tip.

12. A wood drill bit comprising:
a plurality of step sections, each of the plurality of step sections comprise at least one flute that defines a cutting edge having an effective diameter where the effective diameter of one of the plurality of step sections is different than the effective diameter of another one of the plurality of step sections wherein each of the plurality of step sections is formed of a first material and a second material.

13. The wood drill bit of claim 12 comprising:
a cutting tip and a shank, a first one of the plurality of step sections being disposed adjacent the cutting tip, a second one of the plurality of step sections being disposed adjacent the shank, and at least one additional one of the plurality of step sections being disposed between the first one of the plurality of step sections and the second one of the plurality of step sections;
the first one of the plurality of step sections and the at least one additional one of the plurality of step sections having a first length and the second one of the plurality of step sections having a second length that is less than the first length where the first one of the plurality of step sections, the at least one additional one of the plurality of step sections and the second one of the plurality of step sections are capable of cutting a hole having a length at least as long as the first length.

14. The wood drill bit of claim 13 where the first length is at least approximately 1.5 inches.

15. The wood drill bit of claim 13 comprising three step sections wherein at least two of the three step sections have a length of at least 1.5 inches.

16. The wood drill bit of claim 13 wherein the first length is at least approximately 2 inches.

17. The wood drill bit of claim 13 wherein the first length is least 1.5 inches and the second length is less than 1.5 inches.

18. The wood drill bit of claim 12 wherein the first material is harder than the second material.

19. The wood drill bit of claim 12 wherein the at least one flute of each of the plurality of step sections is disposed on the same curve such that the at least one flute of each of the plurality of step sections define a continuous curve along a length of the bit.

20. The wood drill bit of claim 12 wherein the at least one flute of each of the plurality of step sections terminates in a radial cutting edge.

21. The wood drill bit of claim 12 wherein at least one step section of the plurality of step sections is formed with a pointed lead screw.

22. The wood drill bit of claim 12 wherein at least one step section of the plurality of step sections is formed with an unthreaded lead tip.

* * * * *